US008768385B2

(12) United States Patent
Chandramouli et al.

(10) Patent No.: US 8,768,385 B2
(45) Date of Patent: Jul. 1, 2014

(54) RADIO IMPACTS DUE TO GROUP TRIGGERING AND PAGING AND SOLUTIONS FOR GROUP TRIGGERING AND PAGING (75) Inventors: Devaki Chandramouli, Plano, TX (US); Guillaume Decarreau, Beijing (CN); Henri Markus Koskinen, Espoo (FI); Lei Du, Beijing (CN); Woonhee Hwang, Espoo (FI); Xiao Tang Xie, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 40 days.

(21) Appl. No.: 13/290,279

(22) Filed: Nov. 7, 2011

(65) Prior Publication Data
US 2013/0115977 A1    May 9, 2013

(51) Int. Cl.
H04M 3/42    (2006.01)
H04H 20/71   (2008.01)
H04W 4/00    (2009.01)
H04L 29/06   (2006.01)
H04W 84/02   (2009.01)
H04W 68/00   (2009.01)

(52) U.S. Cl.
CPC ........... *H04L 63/104* (2013.01); *H04W 84/027* (2013.01); *H04W 68/00* (2013.01)
USPC ........ 455/458; 455/414.1; 370/312; 370/329; 713/151

(58) Field of Classification Search
CPC ..... H04W 8/14; H04W 84/027; H04W 68/00; H04W 4/06; H04L 63/104
USPC ...................... 370/312, 329, 328, 400, 435.1; 455/414, 458, 456.1, 404.2, 450; 713/151
See application file for complete search history.

(56) References Cited

U.S. PATENT DOCUMENTS 6,519,239 B1 *  2/2003  Panchal et al. ................. 370/335
6,710,702 B1 *  3/2004  Averbuch et al. .............. 340/7.1
(Continued)

FOREIGN PATENT DOCUMENTS

EP    2015598 A1    1/2009
EP    2369883 A1    9/2011
(Continued)

OTHER PUBLICATIONS

"Group paging for MTC devices", LG Electronics Inc., 3GPP TSG-RAN2 Meeting #70bis, R2-104004, Jun.-Jul. 2010, 2 pgs.
(Continued)

*Primary Examiner* — Nizar Sivji
(74) *Attorney, Agent, or Firm* — Harrington & Smith (57) ABSTRACT A method includes transmitting a paging indicator indicating to user equipment assigned to one or more groups that the user equipment are to attempt to receive paging messages including paging information targeted to at least one of the one or more groups; and transmitting in a channel the paging information in the paging messages. Another method includes receiving a paging indicator indicating a user equipment is to attempt to receive paging messages including paging information targeted to at least one of one or more groups; and receiving from a channel the paging information in the paging messages. A method includes sending a request message to user equipment assigned to one or more groups, the request message comprising an indication to cause the user equipment to read device trigger information in a system broadcast message; and sending the device trigger information in the system broadcast message.

24 Claims, 4 Drawing Sheets (56) References Cited

U.S. PATENT DOCUMENTS

| | | | |
|---|---|---|---|
| 2006/0072517 A1* | 4/2006 | Barrow et al. | 370/335 |
| 2009/0156196 A1* | 6/2009 | Somasundaram et al. | 455/423 |
| 2010/0110965 A1* | 5/2010 | Kojima | 370/312 |
| 2010/0329201 A1* | 12/2010 | Kang et al. | 370/329 |
| 2011/0002250 A1* | 1/2011 | Wang et al. | 370/311 |
| 2011/0051668 A1* | 3/2011 | Lee et al. | 370/328 |
| 2011/0201344 A1 | 8/2011 | Ryu et al. | 455/450 |

FOREIGN PATENT DOCUMENTS

| | | |
|---|---|---|
| WO | WO-2011/100497 A1 | 8/2011 |
| WO | WO-2011/116849 A1 | 9/2011 |

OTHER PUBLICATIONS

"Pull based RAN overload control", Huawei, China Unicom, 3GPP TSG-RAN WG2 Meeting #71, R2-104870, Aug. 2010, 4 pgs.

"Group paging for MTC devices", LG Electronics, Inc., 3GPP TSG-RAN2 Meeting #71, R2-104878, Aug. 2010, 3 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36300 V8.12.0, Mar. 2010, 149 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS36.300 V9.7.0, Mar. 2011, 174 pgs.

"$3^{rd}$ Generation Partnership Project; Technical Specification group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0, Jun. 2011, 194 pgs.

"$3^{rd}$ Generation Partnership Project; Technical Specification Group Radio access Network; Radio Resource Control (RRC); Protocol specification (Release 10), Sections 8.6.3.2 and 8.6.3.13", 3GPP TS 25.331 V10.4.0, pp. 400 and 413-414, Jun. 2011.

"$3^{rd}$ Generation Partnership Project; Technical Specification Group radio Access Network; User Equipment (UE) procedures in idle mode and procedures for cell reselection in connected mode (Release 9) Sections 8.1. and 8.3", 3GPP TS 25.304 V9.3.0, pp. 42-46, Sep. 2010.

"$3^{rd}$ Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.1.0, 33 pgs., Mar. 2011.

"$3^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0, 296 pgs., Sep. 2011.

"$3^{rd}$ Generation Partnership Project; Technical Specification Group Radio Access Network; Evolved Universal Terrestrial Radio Access (E-UTRA); Further advancements for E-UTRA physical layer aspects (Release 9), Section 9.1.2", 3GPP TR 36.814 V9.0.0, pp. 20-21, Mar. 2010.

* cited by examiner

RADIO IMPACTS DUE TO GROUP TRIGGERING AND PAGING AND SOLUTIONS FOR GROUP TRIGGERING AND PAGING

TECHNICAL FIELD

This invention relates generally to wireless networks and, more specifically, relates to paging user equipment using the wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
APN access point name
AS access stratum
DRX discontinuous reception
DT device trigger
eNB base station, evolved Node B (also, eNodeB)
E-UTRAN evolved UTRAN (LTE)
FDD frequency division duplex
GGSN gateway GPRS support node
GPRS general packet radio service
GSM global system for mobile communications
HLR home location register
ID identification
IMSI international mobile subscriber identity
LTE long term evolution
LTE-R LTE railways
MBMS multimedia broadcast/multimedia service
MBSFN multi-media broadcast over a single frequency network
MME mobility management entity
MMEC MME code
MTC machine-type communication
M2M machine-to-machine
PBP paging block periodicity
PCCPCH primary common control physical channel
PDCCH physical downlink control channel
PDN packet data network
PI page indicator
PICH paging indicator channel
PF paging frame
PMR public mobile radio
PO paging occasion
P-RNTI paging RNTI
RAN radio access network
RN radio network
RNTI radio network temporary identifier
RRC radio resource control
SACCH slow assisted control channel
SAE system architecture evolved
SCCPCH secondary common control physical channel
SGSN serving GPRS support node
SIB system information block
SFN system frame number
SMS short message service
S-TMSI SAE TMSI
TMSI temporary mobile subscriber entity
VGCS voice group call service
UE user equipment
UMTS universal mobile telecommunications system
U-RNTI UTRAN-RNTI
UTRAN universal terrestrial radio access network User equipment (UE) originally were primarily wireless devices such as cellular phones. Now, UEs are used in railway systems for voice and data communications between, e.g., the driver, staff, and the control center and for train positioning, fleet management, remote diagnostics, and train control. LTE-R (long term evolution-railway) is being defined to further address bandwidth and other issues. UEs are also used for public mobile radio, which supports technologies such as group calling or instant calling (e.g., push-to-talk). Furthermore, there are UEs that support machine type communications (MTC), such as sensors that can provide information to a central facility as in the railway system. MTC communication also includes machine-to-machine (M2M) communications, where one "machine" such as a sensor communicates with another "machine" such as a controller. Many of these UEs are arranged in groups. For instance, certain types of sensors may be assigned to one group, or certain personnel could be assigned one group. Therefore, instead of having primarily point-to-point communications, modern wireless communications systems also have to support UEs that are arranged in groups.

As an example, the VGCS (voice group call service) enables a calling service subscriber or calling dispatcher to establish a voice group call to destination subscribers belonging to a predefined group call area and group ID (identification). Applications for voice group call services typically involve multiple group members in a small group call area, for which the VGCS should provide spectrum efficient solutions. The VGCS is applicable to, e.g., LTE-R and PMR.

Relative to MTC, for many M2M applications, there may be an interest to have a poll model for communications between MTC devices and the MTC server. This may be because the MTC user (i.e., a person using services provided by the MTC server) wants to be in control of communication from MTC devices, and does not allow MTC devices to randomly access the MTC server. Also, for applications where normally the MTC devices initiate communications, there may occasionally be a need for the MTC server to poll data from the MTC devices.

A primary technique for accessing groups of UEs is through group paging. It would be beneficial to provide group paging, e.g., while still allowing UEs the ability to reduce power.

SUMMARY

In an exemplary embodiment, a method includes transmitting a paging indicator indicating to user equipment assigned to one or more groups that the user equipment are to attempt to receive one or more paging messages including paging information targeted to at least one of the one or more groups; and transmitting in a channel the paging information in the one or more paging messages.

In another exemplary embodiment, a computer program product includes a computer-readable medium bearing computer program code embodied therein for use with a computer, the computer program code includes: code for transmitting a paging indicator indicating to user equipment assigned to one or more groups that the user equipment are to attempt to receive one or more paging messages including paging information targeted to at least one of the one or more groups; and code for transmitting in a channel the paging information in the one or more paging messages.

In a further exemplary embodiment, an apparatus includes means for transmitting a paging indicator indicating to user equipment assigned to one or more groups that the user equipment are to attempt to receive one or more paging messages comprising paging information targeted to at least one of the one or more groups; and means for transmitting in a channel the paging information in the one or more paging messages.

In an additional exemplary embodiment, an apparatus includes one or more processors and one or more memories including computer program code. The one or more memories and the computer program code are configured to, with the one or more processors, cause the apparatus to perform: transmitting a paging indicator indicating to user equipment assigned to one or more groups that the user equipment are to attempt to receive one or more paging messages comprising paging information targeted to at least one of the one or more groups; and transmitting in a channel the paging information in the one or more paging messages.

In an additional exemplary embodiment, a method includes receiving, at a user equipment assigned to one or more groups, a paging indicator indicating to the user equipment that the user equipment is to attempt to receive one or more paging messages including paging information targeted to at least one of the one or more groups; and receiving from a channel the paging information in the one or more paging messages.

In another exemplary embodiment, a computer program product includes a computer-readable medium bearing computer program code embodied therein for use with a computer, the computer program code comprising: code for receiving, at a user equipment assigned to one or more groups, a paging indicator indicating to the user equipment that the user equipment is to attempt to receive one or more paging messages including paging information targeted to at least one of the one or more groups; and code for receiving from a channel the paging information in the one or more paging messages.

In a further exemplary embodiment, an apparatus includes means for receiving, at a user equipment assigned to one or more groups, a paging indicator indicating to the user equipment that the user equipment is to attempt to receive one or more paging messages comprising paging information targeted to at least one of the one or more groups; and means for receiving from a channel the paging information in the one or more paging messages.

In an additional exemplary embodiment, an apparatus includes one or more processors, and one or more memories including computer program code. The one or more memories and the computer program code are configured to, with the one or more processors, cause the apparatus to perform: receiving, at a user equipment assigned to one or more groups, a paging indicator indicating to the user equipment that the user equipment is to attempt to receive one or more paging messages comprising paging information targeted to at least one of the one or more groups; and receiving from a channel the paging information in the one or more paging messages.

An additional exemplary embodiment includes an apparatus including one or more processors and one or more memories including computer program code. The one or more memories and the computer program code configured to, with the one or more processors, cause the apparatus to perform: sending a request message to user equipment assigned to one or more groups, the request message comprising an indication to cause the user equipment to read device trigger information in a system broadcast message; and sending the device trigger information in the system broadcast message.

A further exemplary embodiment includes an apparatus including one or more processors and one or more memories including computer program code. The one or more memories and the computer program code configured to, with the one or more processors, cause the apparatus to perform: receiving, at a user equipment assigned to one or more groups, a request message comprising an indication to cause the user equipment to read device trigger information in a system broadcast message; and receiving the device trigger information in the system broadcast message.

DETAILED DESCRIPTION OF THE DRAWINGS

Before proceeding with description of exemplary embodiments, it is helpful at this point to describe certain communication systems, since these systems are referenced below. The exemplary embodiments herein are useful in UTRAN (universal terrestrial radio access network-long term evolution) and E-UTRAN (evolved UTRAN), although E-UTRAN will be described herein. A specification of a communication system known as E-UTRAN (also referred to as UTRAN-LTE, universal terrestrial radio access network-long term evolution, or as E-UTRA) is 3GPP TS (technical standard) 36.300, V8.12.0 (2010 04), "3rd Generation Partnership Project; Technical Specification Group Radio Access Network; Evolved Universal Terrestrial Radio Access (E UTRA) and Evolved Universal Terrestrial Access Network (E-UTRAN); Overall description; Stage 2 (Release 8)". This system may be referred to for convenience as LTE Rel-8. In general, the set of specifications given generally as 3GPP TS 36.xyz (e.g., 36.211, 36.311, 36.312, etc.) may be seen as describing the LTE system. Release 9 (Rel-9) versions of these specifications have been published, including 3GPP TS 36.300, V9.7.0 (2011-3). Release 10 (Rel-10) versions of these specifications have also been published, including 3GPP TS 36.300, V 10.4.0 (2011-06). Work on Rel-11 is ongoing and should be finished sometime in 2012 for RAN1 (physical layer). Rel-12 work has not started as of the drafting of this disclosure, but studies are currently proceeding for what will be included in Rel-12. Thus, there are multiple releases of communication systems for user equipment (e.g., wireless devices communicating at least over cellular frequencies) and base stations, and these releases describe implementation details for user equipment and the communication systems. The exemplary embodiments below are primarily directed to future (relative to the current date) releases of the communication systems, as new paging techniques are provided.

Figure 1:
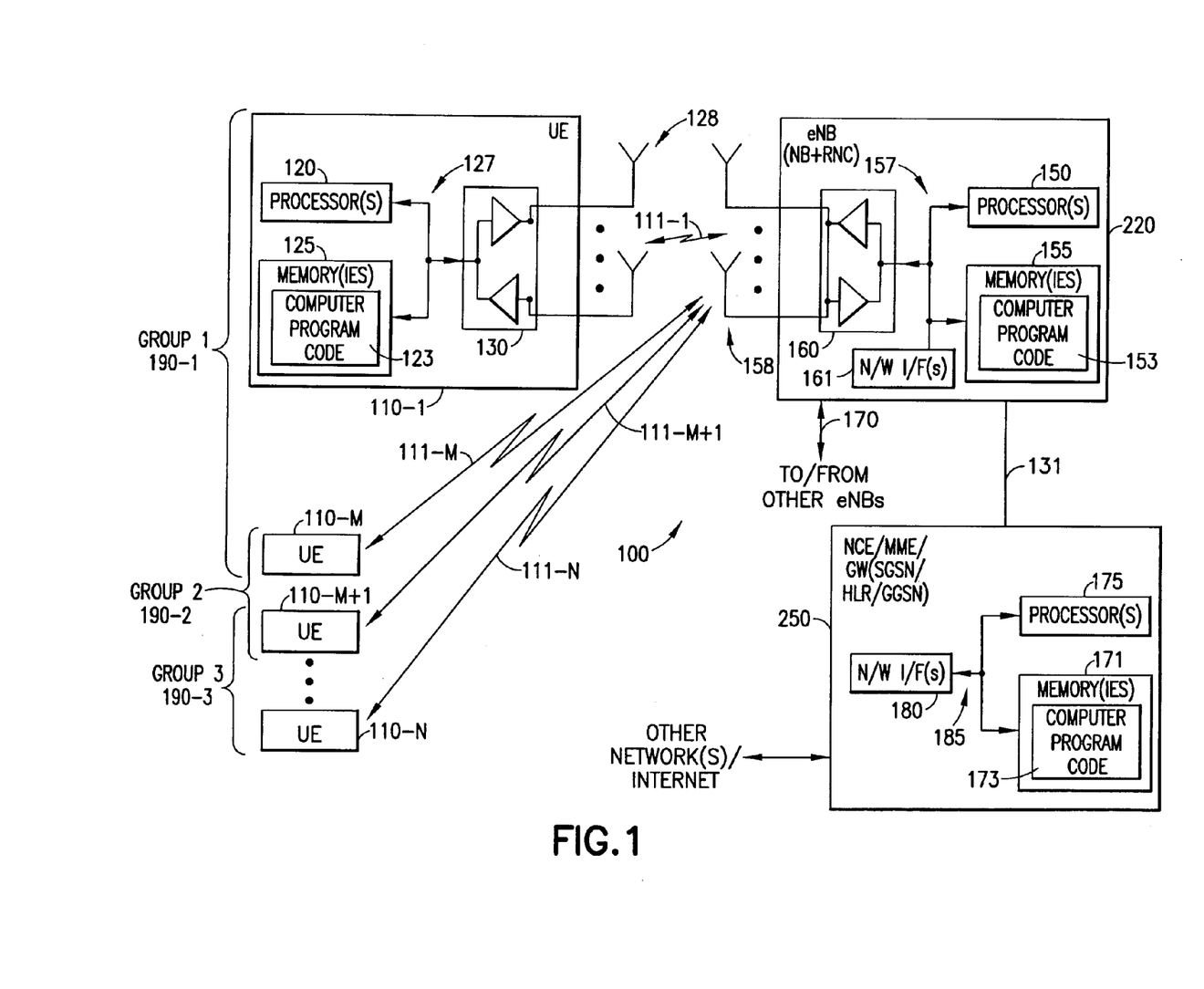
FIG. 1 is a block diagram of an exemplary system in which the exemplary embodiments may be practiced.

Before addressing in more detail problems with current techniques for group paging and exemplary embodiments to reduce or eliminate these problems, it is helpful to describe an exemplary system in which the exemplary embodiments may be practiced. FIG. 1 shows such an exemplary system. In FIG. 1, N UEs 110 are in wireless communication with a network 100. Only UE 110-1 is described in more detail herein; the other UEs 110 are assumed to be similar. The user equipment 110-1 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein. Each UE 110 communicates with eNB 220 via link 111.

The UEs 110 are divided into a number of groups 190 in this example. UEs 1 through M are in group 1 (190-1); UEs M and M+1 are in group 2 (190-2); and UEs M+1 through N are in group 3 (190-3). Each of the UEs M and M+1 therefore belong to two groups.

The entity 220 includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the entity 220 to perform one or more of the operations as described herein. The one or more network interfaces 161 communicate over a network such as the networks 170 and 131. Two or more entities 220 communicate using, e.g., network 170. The network 170 may be wired or wireless or both.

In an LTE example, the entity 220 is an eNB and the network 170 may implement, e.g., an X2 interface. The wireless network 100 may include a network control element (NCE) 205 that may include MME/SGW functionality, and which provides connectivity with a further network, such as a telephone network and/or a data communications network (e.g., the Internet). The eNB 220 is coupled via a network 131 to the NCE 250. The network 131 may be implemented as, e.g., an S1 interface. The NCE 250 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 250 to perform one or more operations described herein.

In an example for UTRAN, the element(s) 220 may include a Node B (NB) and a radio network controller (RNC). The element(s) 250 may include a serving GPRS support node (SGSN), home location register (HLR), and/or a GGSN, as examples. The network 131 may be implemented as an Iu interface.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As described above, a primary technique for accessing groups of UEs is through group paging. The following use cases involve group paging and are to be addressed in 3GPP based on operator and customer requirements. These use cases have a very high priority due to the expanding markets requiring group paging. For instance, M2M is a growing market, and many GSM operators expect to be able to trigger millions of devices nationwide, to access devices like smart meters. As another example, the LTE-R market will be an evolving market that will need such a solution as well.

An exemplary case from an M2M perspective is as follows. UE(s) that belong to a group should be triggered together. For instance, a network might request devices 1000 to 1999 (using IDs) to report back certain information. Also, the UE(s) can belong to multiple groups. Requirements to address this use case are as follows. The network should provide a mechanism to send a broadcast message within a particular geographic area to a MTC group, e.g., to wake up the MTC devices that are members of that MTC group. Only MTC devices of the target group configured to receive the broadcast message will recognize the broadcast message. The geographic area for the broadcast may be a cell sector, a cell, or a group of cells. Furthermore, verification of receipt of a broadcast message is not necessary.

An exemplary use case from the LTE-R, PMR perspectives is as follows. The UE(s) should be triggered together, to request for them to join a group call. Since the group calls can happen simultaneously, UE(s) that belong to multiple groups can receive trigger indications from different groups at the same time. It is then up to the UE(s) to decide which call the UE(s) needs to join. Requirements to address this use case are as follows. The information "To which group or group(s) a subscriber belongs" is stored as part of a user's subscription. This is static information. The subscriber could belong to more than one group. The subscriber is notified of group calls and the decision is left up to the subscriber on which call he or she desires to join.

Thus, a group-paging scheme needs to be designed with a proper trade-off between the resulting paging load, the paging capacity of the network, and the power-consumption implications to the UE from monitoring group paging, all this preferably scalable also with the number of groups applicable to the network on one hand, and to the UE on the other.

It is known that group paging can be used to page the UE(s) that belong to a group. Group paging can be performed using shared TMSI (temporary mobile subscriber entity) calculated using the group ID and allocated by the network.

There has been some discussion in RAN2 (radio access network 2, a working group in 3GPP) about how to enable group paging. One proposal is that MTC could be organized into groups which are represented by group ID. The MTC devices monitor the P-RNTI (paging-radio network temporary identifier) in PDCCH (physical downlink control channel) at paging occasions (POs) computed by either its own IMSI (international mobile subscriber identity) or group ID. Other discussions have presented RAN2 proposals by introducing the group paging. One proposal is to calculate the PO based on the group ID. The other proposal includes group ID in a paging message. All the proposals reuse existing mechanisms to calculate paging frames and paging occasions except that group ID is utilized instead of UE individual ID. However, if MTC device belongs to multiple groups, i.e., is associated with multiple group IDs, the MTC device needs to wake up at multiple POs in order to detect the paging messages destined to any of its group IDs and this will drain the UE battery quickly.

In UTRAN, group paging functionality is described in specification 25.331, section 8.6.3.13, "Group release information". More particularly, 3GPP TS 25.331 V10.4.0 (2011-06), section 8.6.3.13. This functionality allows targeting UEs in groups (based on the variable U_RTNI) to release the RRC connection. This feature, however, does not provide any specific handling of the paging indication procedure: the UE still monitors the paging indicator according to its IMSI.

The instant invention solves these problems through, e.g., an optimized mechanism that will only trigger the devices that belong to the group and are intended to be triggered by the network. The mechanism should not impact other (non-paged) UE(s) (i.e., more than the impact caused by paging other UEs today). It is expected that the UEs will be paged together when the UEs are in idle mode, or CELL_PCH, URA_PCH states in case of UTRAN in order for the network 100 to be able to trigger the UEs. Additionally, this disclosure also proposes a mechanism to deliver trigger information to multiple UEs.

In an exemplary embodiment, it is proposed to incorporate one or more of the following modifications in UTRAN and E-UTRAN.

(1) Use only a common paging indicator for all groups to notify all groups, or in some possible embodiments for a subset of groups, to notify of an actual forthcoming group-paging message. This indicator will be in addition to the legacy paging mechanism. The existing paging subframes will be reused in an exemplary embodiment to avoid issues with possible MBSFN subframes used, e.g., for MBMS, relay. As is known, relay is a scenario where a relay node connects as an intermediate node with a donor eNB and UEs. Since for inband relay (see 3GPP TS 36.814), UEs connecting to the RN only listen to non-MBSFN subframes, therefore, the group paging message should not be sent in those MBSFN subframes so that a UE is able to receive the group paging.

(2) Alternate group paging cycles with legacy paging cycles. Design the DRX cycle 240 of the group paging cycle 245 (see FIG. 2) for the group and the DRX cycle 280 of the legacy paging cycle 280 in such a way that the UE is waking up the same number of times as the UEs with legacy paging DRX cycles would be waking up if only performing legacy DRX cycles.

In order to achieve this, UE should monitor its legacy paging occasion every two DRX cycles (in an exemplary embodiment), rather than per DRX cycle, and in the DRX cycle where the UE does not monitor the legacy paging occasion, the UE monitors the group paging occasion. The term "paging occasion" has slightly different meanings in UMTS and LTE. However, the term "paging occasion" in both UMTS and LIE refers at some point to the position of the element (e.g., a paging indicator, typically a bit) the UE should monitor for paging. In UMTS, this is divided into two parameters: PO (Paging Occasion) for the SFN and PI (Page Indicator) for the position in the radio frame. See 3GPP TS 25.304, section 8.3. More specifically, a legacy paging occasion in UMTS is the SFN of the PICH frame where the UE monitors its paging indicator; put another way, the SFN of the PCCPCH frame in which the PICH frame begins, the UE monitors the group paging occasion. The definition in LTE (see 3GPP TS 36.304 section 7.1) is as follows: One Paging Occasion (PO) is a subframe where there may be P-RNTI transmitted on PDCCH addressing the paging message. So the term PO in LTE is a concept for a subframe rather than a SFN. The radio frame, which may contain one or multiple paging occasion(s) is called "paging frame (PF)".

Figure 2:
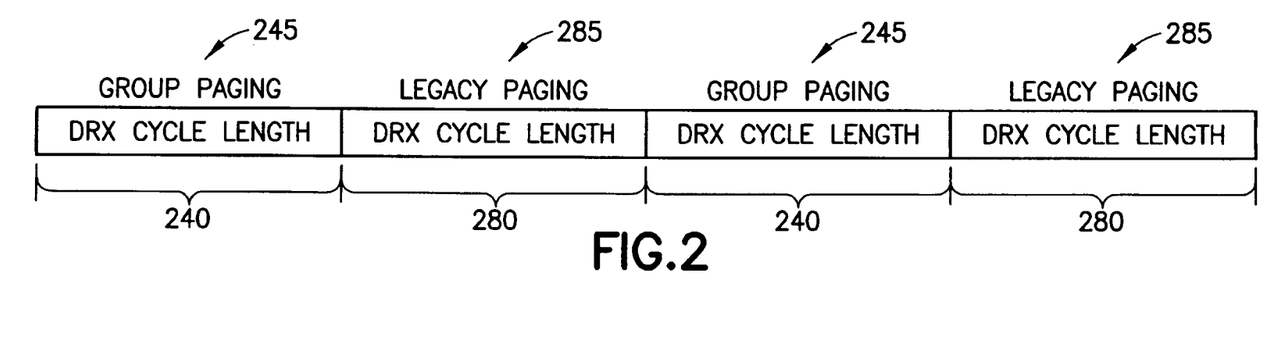
FIG. 2 is an example of alternating group paging cycles and legacy paging cycles.

(3) In order to ensure that UE does not drain its battery by waking up too many times for different group paging, the following example techniques for group paging are proposed.

a. The position of the paging indicator and its corresponding frame position in the group paging cycle 245/DRX cycle 240 will change in time. Based on a specific algorithm, based for example on the SFN number, the page indicator (PI) and Paging Occasion (PO) (into which the paging indicator is placed) are calculated so that the paging indicator is spread in the paging indication space. That is, the paging indicator will be placed somewhere in the paging indication space, at a location defined by the algorithm and the corresponding PI and PO. The paging indicator space is, in an exemplary embodiment, the frame location in the group paging cycle 245/DRX cycle 240 and the location of the paging indicator inside the frame. It is noted that varying the position of the paging indicator and its corresponding frame position saves power by saving collisions between UEs listening to the same paging indicator space, as those UEs not listening at a particular group paging cycle 245 (or a portion thereof) can be in a low power mode.

b. The "common paging indicator for all group paging" embodiment could provide an indicator, e.g., one new bit in the paging message, indicating that in this and/or a following paging cycle, one or more groups is/are being paged in the paging occasion defined by the shared S-TMSI. Only after detecting this bit, a UE monitoring for any group paging would need to check also the paging occasion defined by the shared S-TMSI in that/those paging cycles. Alternatively, the indicator in the paging message can be a few bits so that each bit can indicate that a certain type of group paging will follow. For instance, one bit could indicate MTC group paging, one bit could indicate LTE-R group paging, one bit could indicate PMR group paging, and the like. It is noted that shared S-TMSI is calculated as follows: <MMEC>+<unique identifier within the MME>, where MMEC is MME code, and the shared S-TMSI is used to assign a common identifier to all the devices (UEs) that belong to a group. In an exemplary embodiment herein, it is proposed to calculate a single group paging occasion for UE(s) that belong to multiple groups. Many different approaches are suggested herein to accomplish this optimally. One possibility is also calculating a paging occasion based on shared S-TMSI. That is, if a set of n bits are allocated commonly for all groups by the MME/SGSN, then replace IMSI in the current formula (shown below for Paging Occasion) to calculate paging occasion with the common 10 bits of S-TMSI.

c. The eNB indicates via SIB separate group paging parameters, which are independent of shared S-TMSI. Such group paging parameters could indicate group paging cycle(s) (could be absent if same as legacy paging cycle) and group paging occasion(s). Upon detecting the information, the UE does not calculate the group paging occasions based on its group ID (e.g., as defined by the S-TMSI); instead, the UE shall monitor the group paging occasion (e.g., within the group paging cycle) as indicated by eNB if the UE belongs to at least one paging group.

A simple example is the eNB indicates subframe #4 (number 4) of the first frame #0 in every group paging cycle is a group paging occasion. If a group paging cycle indication is not provided by eNB, then the UE assumes the group paging cycle and paging frame are the same as that for legacy paging cycle and paging frames. But the UE shall monitor subframe #4 of the first frame in the paging frames for group paging.

Some variants are listed below to avoid UEs reacting to the group paging at the same time when a large number of UEs belong to at least one MTC group:

i) Duplicate the group paging cycle, i.e., group paging cycle+offsetting the group paging cycle by K subframes. In this example, more resources are consumed than with single group paging cycle, but UEs may select to monitor one of the multiple group paging cycles so as to distribute UEs in time.

ii) Define more than one group paging cycle indicated from eNB, e.g., group paging cycle #1 (number one) applies to groups #1-10 (numbers one through 10); group paging cycle #2 applies to groups #11-20. In this example, the UEs could be distributed somehow, but at the cost of more power consumption because each UE needs to monitor more paging occasions if the UE belongs to more than one group.

iii) Define more than one group paging cycle and/or paging occasions indicated from eNB based on the type of the group paging, e.g., group paging occasion (PO) #0 for MTC group paging, group PO #1 for LTE-R group call, group PO #4 for PMR group paging, and the like. In this example, the UEs could be distributed depending on the type of its group and avoids monitoring the group pagings which are not relevant to the group to which the UE belongs.

How the above mentioned three proposals are accomplished for E-UTRAN and UTRAN are explained below.

Regarding the E-UTRAN paging indicator and DRX cycle length determination, examples of these are presented below.

In an exemplary embodiment, DRX cycles for regular (legacy) paging and group paging could be allocated in a dedicated UE message, e.g., ATTACH ACCEPT, TAU ACCEPT. The MME/SGSN (e.g., MME 250 in FIG. 1; the SGSN is not shown) should provide the DRX cycle to the eNB. Logic (e.g., as part of computer program code 123, 153) within the UE 110 and the eNB 220 should be modified such that the higher of the two DRX values (common DRX cycle in the broadcast message, DRX cycle in the dedicated UE message) are used for the paging cycle. This is mainly to ensure the UE is not waking up more often than necessary. E-UTRAN paging frames (PF) and paging occasions (PO) are defined in TS 36.304 section 7. See, e.g., 3GPP TS 36.304 V10.1.0 (2011-03), section 7, "Paging".

Another approach for group paging determination is as follows. In a simple technique, group paging can obey the defaultPagingCycle already broadcast in SIB2 (for defaultPagingCycle, see, e.g., 3GPP TS 36.331; 3GPP TS 25.304 section 8.3 and 3GPP TS 25.331 section 8.6.3.2), whose possible values range between, e.g., 320ms (milliseconds) to 2.56s (seconds), as well as nB also broadcast in SIB2 (see section 7 of 3GPP TS 36.304). In another example, the group-paging indicator can be broadcast (and monitored) in the PF and PO defined by UE_ID=0. In a further example, the group paging indicator can be realized, e.g., as an extension bit or extension bits in the paging RRC message. In yet another example, the transmission of the group paging indicator means that in the ongoing paging period, defined as changing whenever SFN mod defaultPagingCycle turns 0, a group will be paged using group S-TMSI in place of UE-specific IMSI (also in PF, PO determination). Reference to the ongoing period works for all groups, because UE_ID=0 implies the first PF and the first PO of the paging period, i.e., the indicator will appear before all other PFs and POs in the paging period.

Concerning UTRAN paging indicator and DRX cycle length determination, examples of this are presented below, and extensions to LTE may easily be implemented. It is noted for LIE that there may be the possibility for a single paging message to have paging information targeted to group(s) of user equipment and targeted to user equipment on an individual basis. For instance, in FIG. 1 above, the UE 110-M could receive a single paging message having paging information targeted to group 190-1, group 190-2, and/or to the UE 110-M individually.

In one example, DRX cycles for regular (legacy) paging and group paging could be allocated in a dedicated UE message, e.g., ATTACH ACCEPT, RAU ACCEPT. SGSN should provide the DRX cycle to the RAN nodes (e.g., eNBs 220). Logic within the UE and the RAN should be modified such that the higher of the two DRX values (common DRX cycle in the broadcast message, DRX cycle in the dedicated UE message) are used for the paging cycle. This is mainly to ensure the UE is not waking up more often than needed.

Examples of formulas include the following. For regular paging, the following exemplary formula may be used:

$$\text{Paging Occasion} = \{(\text{IMSI div } K) \bmod (\text{DRX cycle length div PBP})\} * \text{PBP} + n*2*\text{DRX cycle length} + \text{frame offset},$$

where PBP=paging block periodicity and n=0, 1, 2 ... as long as SFN is below its maximum value (i.e., n has to be chosen to be within a proper range, e.g., 0 ... 4095), K is a parameter linked to the number of SCCPCHs (see 3GPP TS 25.304, section 8.1), and the frame offset is configured by the network (e.g., base station 220) and is already defined by specification. The "div" operation returns a quotient for division of one number by another. The "mod" (modulo) operation finds the remainder of division of one number by another. In comparison with a conventional paging occasion scheme, the Paging Occasion formula above for regular paging makes a paging occasion occur every other (e.g., 2n) DRX cycle (as shown in DRX cycles 280 in FIG. 2).

The actual page indicator within a paging occasion that the UE shall read is similarly determined based on IMSI. The page indicator to use is calculated by using the following formula:

$$\text{PI} = \text{DRX Index} \bmod N_p,$$

where DRX index=IMSI div 8192, and Np is described in 3GPP TS 25.304 section 8.3 (e.g., Np, for FDD, is the number of page indicators within a frame).

For group paging, the following exemplary formula may be used:

$$\text{Paging Occasion} = \{n\} \bmod (\text{DRX cycle length div PBP}) * \text{PBP} + ((2*n+1)*\text{DRX cycle length}) + \text{frame offset},$$

where n=0, 1, 2 ... as long as SFN is below its maximum value. In comparison with a conventional paging occasion scheme, the Paging Occasion formula above for group paging makes a paging occasion occur every other (e.g., 2n+1) DRX cycle time (as shown in DRX cycles 240 in FIG. 2). In other words, if the regular paging occasion occurs every "even" (e.g., 2n) DRX cycle 280, then the group paging occasion occurs every "odd" (e.g., 2n+1) DRX cycle 240.

The actual page indicator within a paging occasion that the UE shall read is similarly determined based on SFN. The page indicator to use is calculated by using the following formula:

$$\text{PI} = (\text{SFN div } 2) \bmod N_p.$$

If desired, more advanced functions can also be used to distribute the paging occasion/paging index.

In another aspect of the invention, it is proposed to include the device trigger information in the broadcast SIB. The device trigger information could include a command for the UE, e.g., that the UE needs to connect towards a certain APN. The device trigger information could, for example, be an AT (ATtention) command (string). This is sent in order for the UE to connect to the network or comply with the instruction provided. In order to ensure that all the UE(s) are not reading the broadcast SIB unnecessarily, an exemplary proposal is to optimize the paging request message by including a device trigger notification bit. If the UE sees this bit, then the UE knows that the UE should read the broadcast SIB and take appropriate action such as forward the information provided in the broadcast SIB to the upper layers. The following exemplary actions may be taken.

1. The network initiates group paging for shared S-TMSI (i.e., a group of devices). The network includes a "device trigger notification" bit in the paging request message.

2. Device trigger information is included in the broadcast SIB, e.g., SIB #10, 11, or 12. If DT (device trigger) notification was present in the paging message, the UE 110 reads the corresponding SIB, which is designed to include device trigger information (e.g., pre-defined application specific command, i.e., "Reporting", APN, or appID). The AS (access stratum) layer within the UE 110 forwards this to the upper layer.

3. The UE responds with a service request.

4. Based on the trigger information, the UE takes appropriate action. The UE 110 initiates a PDN (packet data network) connectivity request (if applicable) or responds with a small amount of data (e.g., via SMS, short message service).

Figure 3:
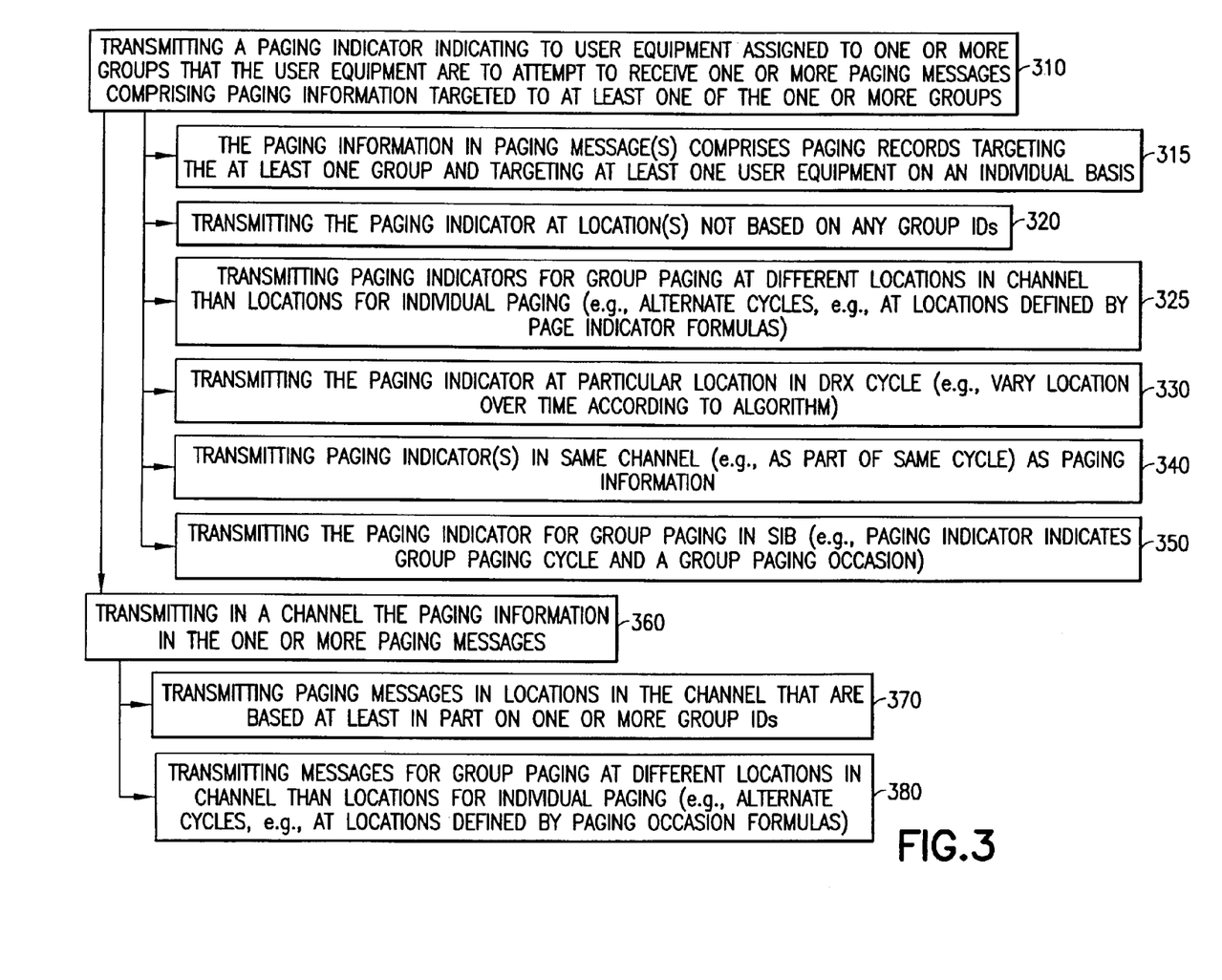
FIG. 3 is a block diagram of a method performed by a network (e.g., base station) for group triggering and paging.

Referring now to FIG. 3, FIG. 3 illustrates a block diagram of a method performed by a network 100 (e.g., a base station 220) for group triggering and paging. Although characterized as a method, the operations performed in FIG. 3 may also be operations performed by an apparatus, operations performed by code on a computer-readable medium, or means for performing the operations. In block 310, the network 100 performs the operation of transmitting a paging indicator indicating to user equipment assigned to one or more groups that the user equipment are to attempt to receive one or more paging messages comprising paging information targeted to at least one of the one or more groups. In block 360, the network 100 performs the operation of transmitting in a channel the paging information in the one or more paging messages. Blocks 315-350 are further examples of block 310. Blocks 370 and 380 are further examples of block 360.

In block 315, the paging information in the paging message(s) comprises paging records targeting the at least one group and targeting at least one user equipment on an individual basis. As explained above, the UE 110-M could receive a single paging message having paging information targeted to group 190-1, group 190-2, and/or to the UE 110-M individually.

In block 320, the network 100 performs the operation of transmitting the paging indicator at location(s) not based on any group IDs. In block 370, the network 100 performs the operations of transmitting paging messages in locations in the channel that are based at least in part on one or more group IDs. As described above, one possibility is to calculate a paging occasion (e.g., for group paging) based on shared S-TMSI. That is, if a set of n bits are allocated commonly for all groups by the MME/SGSN, then replace IMSI in the current formula (shown above for Paging Occasion) to calculate paging occasion with the common 10 bits of S-TMSI.

Typically, if block 320 is performed, block 370 is performed, but one may be performed without the other. For instance, the location of the paging indicator may be based in part on one or more group IDs.

In block 325, the network 100 performs the operation of transmitting paging indicators for group paging at different locations in channel than locations for individual paging. That is, the alternate cycles shown in FIG. 2 may be used, e.g., with the paging indicators for group paging and individual user equipment paging transmitted at locations defined by Page Indicator formulas described above. In block 380, the network 100 performs the operation of transmitting messages for group paging at different locations in channel than locations for individual paging. For instance, the group and individual paging may be transmitted using alternate cycles as shown in FIG. 2 and at locations defined by Paging Occasion formulas described above. Usually, if block 325 is performed, block 380 is also performed, but this is merely exemplary. For instance, the paging indicator for group paging may be sent in the SIB (see block 350).

In block 330, the network 100 performs the operation of transmitting the paging indicator at particular location in a DRX cycle. This location may vary over time according to an algorithm, as described above. In block 340, the network 100 performs the operation of transmitting paging indicator(s) in the same channel (e.g., as part of same cycle) as the paging information is transmitted. That is, as described above, the PI (comprising the paging indicator) is transmitted in a cycle defined by a corresponding Paging Occasion. In block 350, the network 100 performs the operation of transmitting the paging indicator for group paging in a SIB. The paging indicator indicates group paging cycle and a group paging occasion at which user equipment will find paging information for one or more groups.

Figure 4:
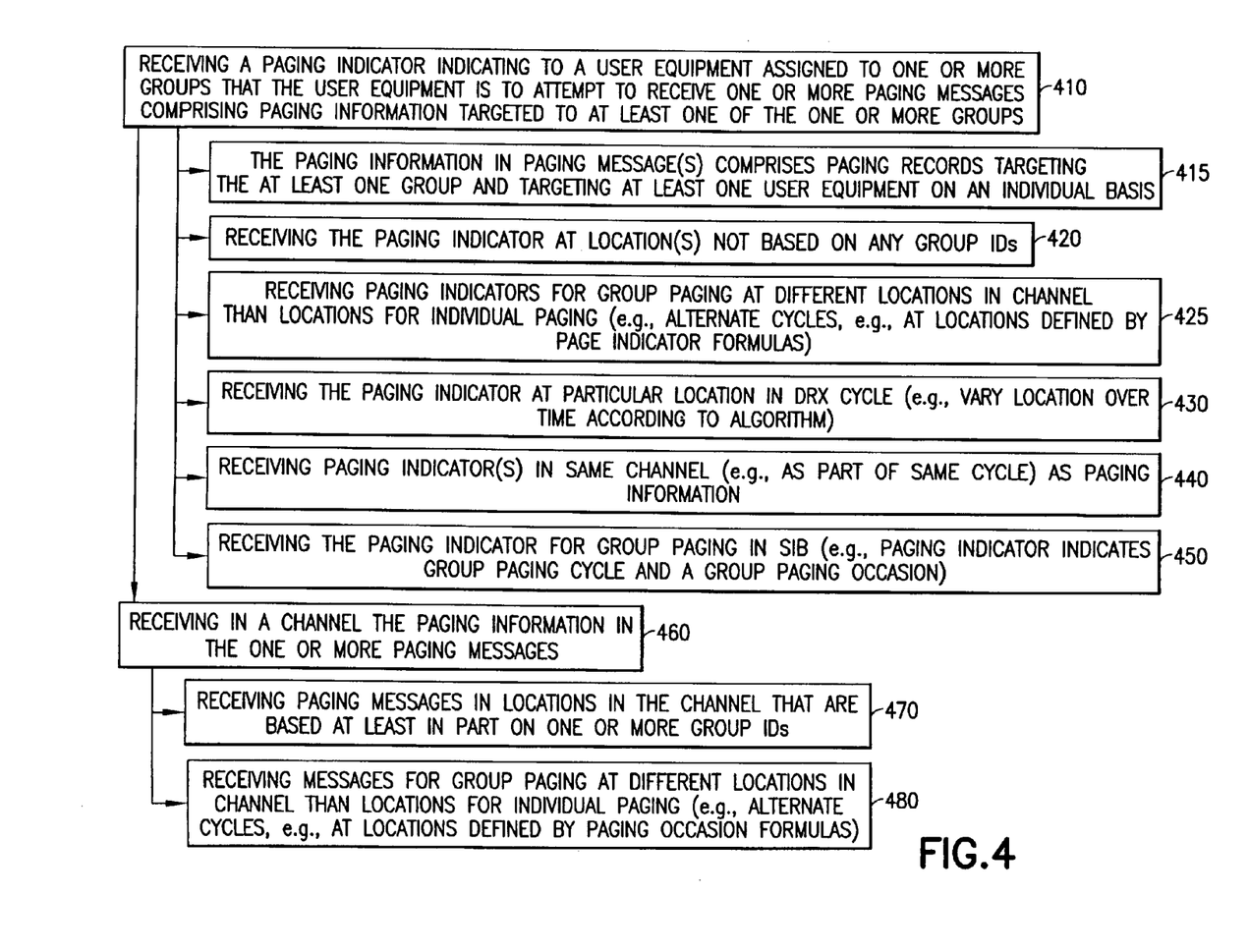
FIG. 4 is a block diagram of a method performed by a user equipment for group triggering and paging.

FIG. 4 is a block diagram of a method performed by a user equipment for group triggering and paging. Although characterized as a method, the operations performed in FIG. 4 may also be operations performed by an apparatus, operations performed by code on a computer-readable medium, or means for performing the operations. In block 410, the user equipment 110 performs the operation of receiving a paging indicator indicating to user equipment assigned to one or more groups that the user equipment are to attempt to receive one or more paging messages comprising paging information targeted to at least one of the one or more groups. In block 460, the user equipment 110 performs the operation of receiving in a channel the paging information in the one or more paging messages. Blocks 415-450 are further examples of block 410. Blocks 470 and 480 are further examples of block 460.

In block 415, the paging information in the paging message(s) comprises paging records targeting the at least one group and targeting at least one user equipment on an individual basis. As explained above, the UE 110-M could receive a single paging message having paging information targeted to group 190-1, group 190-2, and/or to the UE 110-M individually.

In block 420, the user equipment 110 performs the operation of receiving the paging indicator at location(s) not based on any group IDs. In block 470, the user equipment 110 performs the operations of receiving paging messages in locations in the channel that are based at least in part on one or more group IDs. As described above, one possibility is to calculate a paging occasion (e.g., for group paging) based on shared S-TMSI. That is, if a set of n bits are allocated commonly for all groups by the MME/SGSN, then replace IMSI in the current formula (shown above for Paging Occasion) to calculate paging occasion with the common 10 bits of S-TMSI. Typically, if block 420 is performed, block 470 is performed, but one may be performed without the other. For instance, the location of the paging indicator may be based in part on one or more group IDs.

In block 425, the user equipment 110 performs the operation of receiving paging indicators for group paging at different locations in channel than locations for individual paging. That is, the alternate cycles shown in FIG. 2 may be used, e.g., with the paging indicators for group paging and individual user equipment paging transmitted at locations defined by Page Indicator formulas described above. In block 480, the user equipment 110 performs the operation of receiving messages for group paging at different locations in channel than locations for individual paging. For instance, the group and individual paging may be transmitted using alternate cycles as shown in FIG. 2 and at locations defined by Paging Occasion formulas described above. Usually, if block 425 is performed, block 480 is also performed, but this is merely exemplary. For instance, the paging indicator for group paging may be sent in the SIB (see block 450).

In block 430, the user equipment 110 performs the operation of receiving the paging indicator at particular location in a DRX cycle. This location may vary over time according to an algorithm, as described above. In block 440, the user equipment 110 performs the operation of receiving paging indicator(s) in the same channel (e.g., as part of same cycle) as the paging information is transmitted. That is, as described above, the PI (comprising the paging indicator) is transmitted in a cycle defined by a corresponding Paging Occasion. In block 450, the user equipment 110 performs the operation of receiving the paging indicator for group paging in a SIB. The paging indicator indicates group paging cycle and a group paging occasion at which user equipment will find paging information for one or more groups.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125 or 155 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   one or more processors; and
   one or more memories including computer program code,
   the one or more memories and the computer program code configured to, with the one or more processors, cause the apparatus to perform:
   transmitting a paging indicator indicating to user equipment assigned to one or more groups of a plurality of groups that the user equipment are to attempt to receive one or more paging messages comprising paging information targeted to at least one of the one or more groups, wherein the paging indicator is a common paging indicator for all groups of the plurality of groups, the common paging indicator indicating to any user equipment assigned to any of the groups of the plurality of groups that in addition to legacy paging the user equipment are to attempt to receive one or more paging messages comprising paging information targeted to at least one of the one or more groups; and
   transmitting in a channel the paging information in the one or more paging messages.

2. The apparatus of claim 1, wherein transmitting the paging information further comprises transmitting the one or more paging messages M a single group paging location in the channel that corresponds to all of the groups.

3. The apparatus of claim 2, wherein transmitting a paging indicator further comprises transmitting the paging indicator at a location in the channel that is not based on the one or more group identifications.

4. The apparatus of claim 2, wherein transmitting the paging information further comprises transmitting the paging information in a group paging occasion transmitted at one or more locations determined at least in part using a number of bits allocated commonly for all groups of the plurality of groups.

5. The apparatus of claim 4, wherein the number of bits allocated commonly for all groups is a portion of a shared system architecture evolved-temporary mobile subscriber entity (S-TMSI).

6. The apparatus of claim 1, wherein the paging information in at least one of the one or more paging messages comprises paging records targeting the at least one group and targeting at least one user equipment on an individual basis.

7. The apparatus of claim 1, wherein transmitting the paging information further comprises transmitting the one or more messages at one or more first locations in the channel, and wherein the one or more memories and the computer program code are further configured to, with the one or more processors, cause the apparatus to perform: transmitting paging information targeting user equipment on an individual basis on one or more second paging messages at one or more second locations on the paging channel, wherein the one or more second paging messages do not contain paging information for any user equipment assigned to a group.

8. The apparatus of claim 7:
   wherein transmitting the paging information further comprises transmitting the one or more group paging locations in first paging cycles;
   wherein transmitting the second paging information further comprises transmitting the one or more second paging locations in second paging cycles; and
   wherein the first paging cycles and second paging cycles are different.

9. The apparatus of claim 8, wherein the first paging cycles alternate with the second paging cycles in a set of the first and second paging cycles.

10. The apparatus of claim 1, wherein transmitting the page indicator further comprises transmitting the page indicator in a determined location in a paging indication space in a discontinuous reception cycle.

11. The apparatus of claim 10, wherein the determined location is determined using an algorithm that varies over time the determined location in the paging indication space.

12. The apparatus of claim 1, wherein transmitting the paging indicator further comprises transmitting the paging indicator in the channel.

13. The apparatus of claim 1, wherein the paging indicator farther indicates that in a current or a subsequent paging cycle comprising the one or more messages, one or more groups is or are being paged in a paging occasion derived from an identity of an addressed group instead of an identity of an individual one of the user equipment.

14. The apparatus of claim 13, wherein the paging indicator further indicates one or more subsets of a plurality of groups to which the one or more groups that are being paged belong.

15. The apparatus of claim 1, wherein transmitting the paging indicator further comprises transmitting the paging indicator in a system information block to user equipment, the paging indicator comprising information indicating a group paging cycle and a group paging occasion, and wherein transmitting the paging information further comprises transmitting the one or more messages in the group paging occasion within the group paging cycle.

16. The apparatus of claim 1, wherein the paging indicator is a single bit.

17. An apparatus, comprising:
one or more processors; and
one or more memories including computer program code, the one or more memories and the computer program code configured to, with the one or more processors, cause the apparatus to perform:
receiving, at a user equipment assigned to one or more groups of a plurality of groups, a paging indicator indicating to the user equipment that the user equipment is to attempt to receive one or more paging messages comprising paging information targeted to at least one of the one or more groups, wherein the paging indicator is a common paging indicator for all groups of the plurality of groups, the common paging indicator indicating to any user equipment assigned to any of the groups of the plurality of groups that in addition to legacy paging the user equipment are to attempt to receive one or more paging messages comprising paging information targeted to at least one of the one or more groups; and
attempting to receive from a channel the paging information in the one or more paging messages.

18. The apparatus of claim 17, wherein receiving the paging information further comprises receiving the one or more paging messages in one or more locations in a single group paging location in the channel corresponds to all of the groups of the plurality of groups.

19. The apparatus of claim 18, wherein attempting to receive the paging information further comprises attempting to receive the paging information in a group paging occasion transmitted at one or more locations determined at least in part using a number of bits allocated commonly for all groups of the plurality of groups.

20. The apparatus of claim 19, wherein the umber of bits allocated commonly for all groups is a portion of a shared system architecture evolved-temporary mobile subscriber entity (S-TMSI).

21. The apparatus of claim 17, wherein the paging information in at least one of the one or more paging, messages comprises paging records targeting the at least one group and targeting at least one user equipment on an individual basis.

22. The apparatus of claim 17, wherein receiving the paging information further comprises receiving the one or more messages at one or more first locations in the channel, and wherein the one or more memories and the computer program code are further configured to, with the one or more processors, cause the apparatus to perform: receiving paging information targeting user equipment on an individual basis on one or more second paging messages at one or more second locations on the paging channel, wherein the one or more second paging messages do not contain paging information for any user equipment assigned to a group.

23. The apparatus of claim 17, wherein the paging indicator is a single bit.

24. An apparatus comprising:
one or more processors; and
one or more memories including computer program code, the one or more memories and the computer program code configured to, with the one or more processors, cause the apparatus to perform:
sending a group paging request message to user equipment assigned to one or more groups of a plurality of groups that the user equipment are to attempt to receive one or more paging messages comprising paging information targeted to at least one of the one or more groups, the group paging request message including a device trigger notification as an indication to cause the user equipment to read device trigger information in a message in a system information block, the device trigger information including a common paging indicator for all groups of the plurality of groups, the common paging indicator indicating to any user equipment assigned to any of the groups of the plurality of groups that in addition to legacy paging the user equipment are to attempt to receive one or more paging message comprising paging information targeted to at least one of the one or more groups; and
sending the device trigger information in the message in the system information block, the message including at least one command for the user equipment.

* * * * *

UNITED STATES PATENT AND TRADEMARK OFFICE
CERTIFICATE OF CORRECTION

PATENT NO. : 8,768,385 B2  
APPLICATION NO. : 13/290279  
DATED : July 1, 2014  
INVENTOR(S) : Chandramouli et al.

Page 1 of 1

It is certified that error appears in the above-identified patent and that said Letters Patent is hereby corrected as shown below:

In the Claims:

Claim 2, col. 14, line 28 "M" should be deleted and --in-- should be inserted.

Claim 13, col. 15, line 15 "farther" should be deleted and --further-- should be inserted.

Claim 21, col. 16, line 14 "paging," should be deleted and --paging-- should be inserted.

Signed and Sealed this  
Thirtieth Day of September, 2014

Michelle K. Lee  
*Deputy Director of the United States Patent and Trademark Office*